United States Patent [19]

Gregory et al.

[11] Patent Number: 5,060,177

[45] Date of Patent: Oct. 22, 1991

[54] TEST CIRCUIT FOR AUTOMATIC TRANSMISSION

[76] Inventors: Stevon D. Gregory, Route 2, Box 217; Fred J. Blackburn, Ret. 4, Box 2960, both of Cushing, Okla. 74023

[21] Appl. No.: 491,163

[22] Filed: Mar. 9, 1990

[51] Int. Cl.⁵ .............................. G05B 19/02
[52] U.S. Cl. .................... 364/580; 73/118.1
[58] Field of Search ........... 364/579, 580, 481; 73/116, 117.2, 117.3, 118.1, 119 R; 324/73.1, 158 R

[56] References Cited

U.S. PATENT DOCUMENTS

| | | | |
|---|---|---|---|
| 4,287,565 | 9/1981 | Haubner et al. | 364/580 |
| 4,363,105 | 12/1982 | Plassmeier | 364/580 |
| 4,646,299 | 2/1987 | Schinabeck et al. | 364/579 |
| 4,764,884 | 8/1988 | Noyori | 364/481 |
| 4,924,391 | 5/1990 | Hirano et al. | 73/117.3 |

Primary Examiner—Salvatore Cangialosi
Attorney, Agent, or Firm—Laney, Dougherty, Hessin & Beavers

[57] ABSTRACT

A test circuit for computer-controlled automatic transmissions which includes a gear selection rotary switch providing enabling inputs to logic circuitry that controls a plurality of electronic switches to energize selected transmission control relays. The control relays then apply operating current to selected combinations of transmission valves to effect transmission operation. The test circuit also provides light indication of hydraulic pressure conditions in the various valve circuits, and push button switches for testing the condition of relays and solenoids.

7 Claims, 1 Drawing Sheet

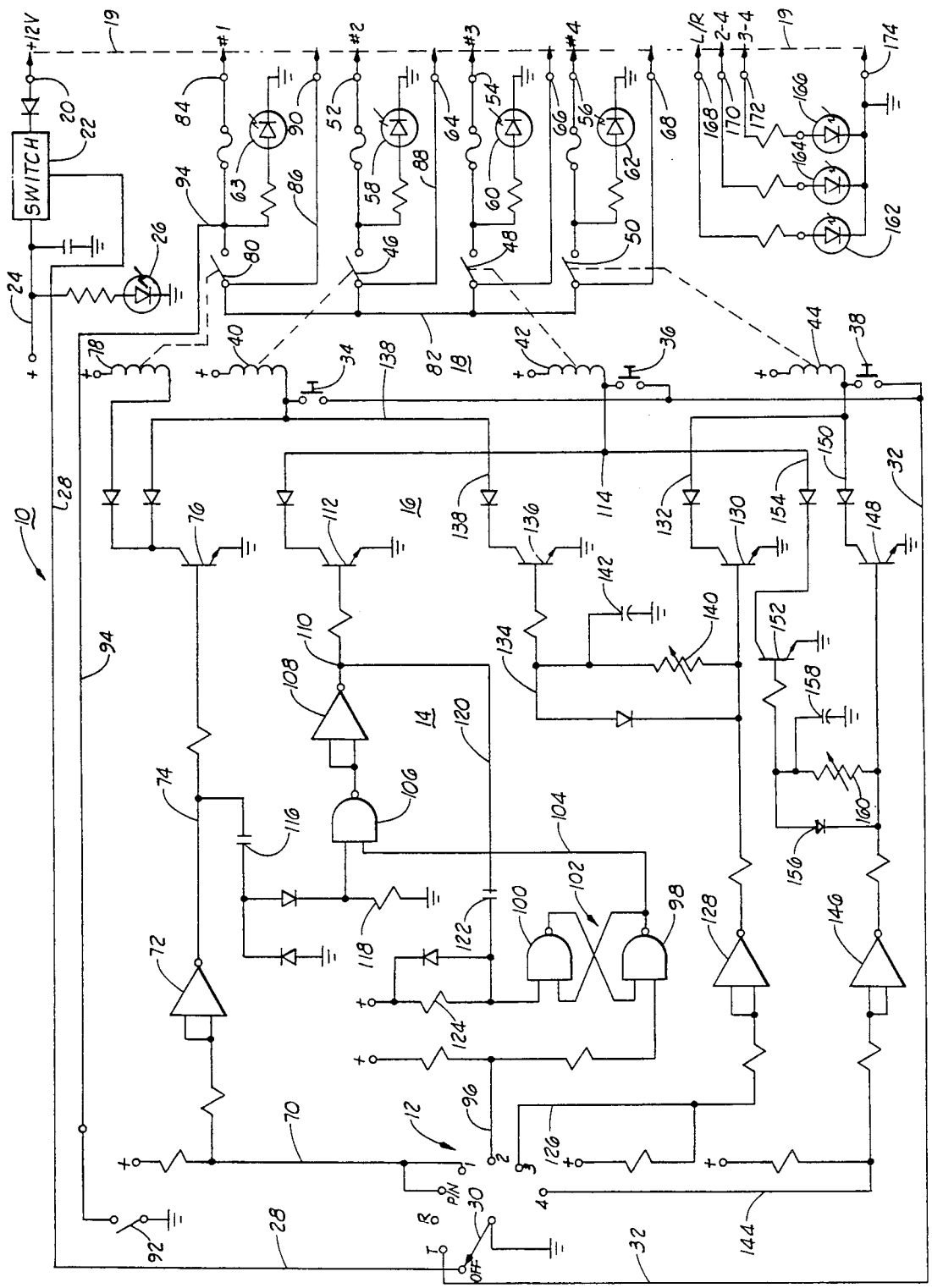

5,060,177

1

TEST CIRCUIT FOR AUTOMATIC TRANSMISSION

BACKGROUND OF THE INVENTION

1. Field of the Invention

The present invention relates to an electronic circuit used for testing functionality of a type of automatic transmission that utilizes solenoid valve control.

2. Description of the Prior Art

There are a great number of electronic test devices that are used for testing various engines, components and other automotive elements. Of recent development have been the various types of automobile computer for controlling engine function as well as automatic transmission operation. No prior art has been discovered that relates to an automatic transmission test device such as that which is the subject of the present invention.

SUMMARY OF THE INVENTION

The present invention is an automatic transmission test circuit for use with computer controlled automatic transmissions. The test circuit consists of a plurality of electronic switches corresponding to a gear position from reverse through high forward gear for actuating one or more transmission solenoids which, in turn, control respective valves and operational oil flow within the transmission. Logic circuitry transmits selector switch information corresponding to a particular gear to energize selected combinations of the electronic switches for actuation of the requisite solenoid valves.

Therefore, it is an object of the present invention to provide a test unit for computer-controlled automotive transmissions.

It is also an object of the invention to provide a test unit that can indicate whether a trouble is in the associated computer or within the transmission unit itself.

It is still further an object of the present invention to provide a highly reliable test unit for use in servicing computer controlled automotive transmissions.

Finally, it is an object of the present invention to provide a complete test indicator for computerized automatic transmissions that reveals the condition of all operating functions.

Other objects and advantages of the invention will be evident from the following detailed description when read in conjunction with the accompanying drawings which illustrate the invention.

BRIEF DESCRIPTION OF THE DRAWING

The single drawing figure is a schematic illustration of the circuit of the present invention.

DETAILED DESCRIPTION OF THE INVENTION

Referring to the drawings, the test device 10 consists of a rotary selector switch 12 that provides selective input to logic circuitry 14 in control of switch circuits 16. Each of the multiple of switch circuits 16 functions in control of selected ones of a bank of relays 18. These relays 18 then provide a plurality of selected outputs to solenoid valves (not shown) within the automatic transmission undergoing tests. The present test circuit 10 is configured for testing of the type A604 automatic transmission, a computer controlled transmission manufactured by Chrysler Corporation.

The test circuit 10 is powered from a plus 12 volt battery source as input through a connector interface 19 at pin connector 20 to an electronic switch 22. When energized, switch 22 provides positive voltage on lead 24 for distribution throughout test circuit 10 as indicated. A grounded LED 26 provides front panel indication of the power ON condition when rotary switch 12 is moved from the OFF position and lead 28 shows a non-grounded condition at switch 22.

As shown in the drawing, the rotary switch wiper 30 is in the OFF position and it may be rotated through seven additional positions that are indicative of the test condition for T (test), R (reverse), P/N (park/neutral), and numerals 1, 2, 3 and 4 for the respective first, second, third and fourth gear testing. The T switch pole is connected to a lead 32 that is connected to supply a ground connection from wiper 30 to respective No. 2, No. 3 and No. 4 push button test switches 34, 36 and 38, respectively. Thus, by depressing one of the test switches 34, 36 or 38, the respective Nos. 2, 3 and 4 relay coils 40, 42 and 44 are fully grounded to energize the respective relay contacts 46, 48 and 50 thereby to provide solenoid output at connector pins 52, 54 and 56. Energization of the respective relays 40, 42 and 44 will also provide front panel indication by illumination of the respective LED devices 58, 60 and 62. Individual excess current ground connections are provided for each of the solenoid valve circuits via connector pins 64, 66 and 68.

In each of the park/neutral and first gear settings of rotary switch wiper 30, a ground is placed on a lead 70 as input to an inverter 72 to cause output lead 74 to go HIGH and allow full conduction of a type NPN transistor 76. The transistor 76 effectively grounds each of relay coils 40 and 78 to close the respective relay contacts 46 and 80. This provides connection of a circuit ground lead 82 to respective connector pins 52 and 84 for connection into solenoids Nos. 2 and 1 of the automatic transmission. Additional ground connections are provided by leads 86 and 88 to respective connector pins 90 and 64. The double grounding leads of sufficiently heavy gauge wire are required since the solenoid actuation within the transmission requires upward of six amperes per coil. A switch 92, the LOCK UP switch, provides ground connection via lead 94 to the No. 1 solenoid connector pin 84. This connection provides lock up of the torque converter clutch.

When the wiper 30 of selector switch 12 is placed in the second gear position, a lead 96 is grounded to provide a LOW input to a NAND gate 98 functioning with a NAND gate 100 as a latch circuit 102. Latched output is then applied via lead 104 to a NAND gate 106 that enables an inverter 108 to provide an output HIGH at junction 110 thereby causing conduction of a type NPN transistor 112 to effectively ground the junction 114 causing energization of relay coil 42. The energization of coil 42 closes relay contact 48 to provide the ground connection to solenoid No. 3 via connector pins 54 and 66. The circuit consisting of capacitor 116, resistor 118, enable gate 106 and latching circuit 102 provide a predetermined pulse output when shifting down from second to first gears only. The pulse output provides a duration that allows energization of No. 3 relay 42, thus preventing the system from lapsing into neutral. The latch circuit 102 is reset by output on a lead 120 and R/C time constant set by capacitor 122 and resistor 124.

When wiper 30 is placed in the third gear position of rotary switch 12, a ground connection is placed on lead 126 to alter conduction in the inverter 128 thereby to trigger conduction in a type NPN transistor 130. Thus, the transistor output lead 132 is effectively grounded to energize relay coil 44 and close relay contact 50 to place the requisite ground connections through connector pins 56 and 68 to the solenoid No. 4 within the automatic transmission. Output from inverter 128 is also applied via lead 134 to the base of an NPN transistor 136 which conducts to show an effective ground via output lead 138 to the No. 2 solenoid coil 40. Energization of coil 40 closes relay contact 46 to provide requisite ground connections to the transmission solenoid No. 2. In the base circuit of transistor 136, a potentiometer 140 and capacitor 142 provide an adjustable R/C time delay that is effective when shifting upward into third gear.

Finally, the selector switch wiper 30 is placed in the fourth gear position to connect ground to lead 144 for input to an inverter 146. The output of inverter 146 then goes HIGH to effect conduction of an NPN transistor 148 thereby to effectively ground lead 150 and cause energization of relay coil 44. This, in turn, closes relay contact 50 to provide the requisite ground connections to the connector terminals 56 and 68 and the solenoid No. 4 within the automatic transmission. The HIGH output from inverter 146 also causes energization of an NPN transistor 152 to effectively ground output lead 154 and energize the No. 3 relay 42. This closes relay contact 48 to provide the ground connections to solenoid No. 3. A time delay consisting of diode 156, capacitor 158 and potentiometer 160 provide a selected time delay when shifting into fourth gear.

Front panel pressure switch indications are provided by LED devices 162, 164 and 166 that are connected in parallel between ground and connector pins 168, 170 and 172, respectively. The connections 168, 170 and 172 function to sense a hydraulic pressure problem. Normal hydraulic pressure within the transmission system may be around sixty pounds and in this condition the LED lights are out. The LED 162 provides indication for the low and reverse pressure switches, LED 164 for the second and fourth gear pressure switch and LED 166 for the third and fourth gear pressure switch. When internal sensors within the automatic transmission sense at least twenty pounds hydraulic fluid relative to one of the pressure switch functions, the applicable LED indicator will extinguish.

In operation, the interface connector 19 of test circuit 10 is connected to the automatic transmission undergoing test through the existing cable harness. The LED 26 will then illuminate indicating that +12-volt power is being input to test circuit 10 at pin connector 20. Also, the LED devices 162, 164 and 166 are illuminated and these front panel indicators will remain in the ON condition until an associated pressure switch operates to turn them off, i.e., when the transmission functions. Thus, pressure switch 162 provides indication for the LOW/REVERSE gears, LED 164 for the second-fourth gear pressure switch, and LED 166 for the third-fourth gear pressure switch.

Rotary switch 12 can then be switched to the T or test position to ground lead 32 that connects to one side of each of pushbutton switches 34, 36 and 38. Selectively depressing these pushbutton switches serves to test the respective relays 40, 42 and 44. Thus, depression of pushbutton switch 34 tests for the second-fourth condition, pushbutton switch 36 tests for the UNDERDRIVE condition, and pushbutton switch 38 tests the OVERDRIVE condition. This terminology relates to the designation accorded the actual solenoid valves within the automatic transmission.

When rotary switch 12 is in the R (REVERSE) position, there is no test procedure. When rotary switch 12 is moved to the PARK/NEUTRAL position, the logic circuitry 14 and switch circuit 16 energize solenoids NO. 1 and NO. 2 in the automatic transmission and the front panel LED devices 63 and 58 are illuminated to so designate. Rotary switch 12 may then be dialed to the first or 1 position and transmission solenoid selection remains the same with solenoids NOS. 1 and 2 energized.

In order to test second gear, no transmission solenoids are activated. Third gear test requires activation of transmission solenoid valves NOS. 2 and 4 and fourth gear test actuates solenoids NOS. 3 and 4. The solenoid indicator LED devices 58, 60, 62 and 63 are turned ON when the solenoid tests GOOD and they are OFF when activated to ground.

The switch 92 is termed the LOCK-UP switch and it provides indication of the torque converter clutch by energizing the transmission solenoid NO. 1 only. This function is effective in the overdrive transmission condition when switched simultaneously with second, third or fourth selection at rotary switch 12.

The foregoing discloses a novel form of test circuit for testing computer controlled automatic transmissions. Changes may be made in combination and arrangement of elements as heretofore set forth in the specification and shown in the drawings; it being understood that changes may be made in the embodiment disclosed without departing from the spirit and scope of the invention as defined in the following claims.

What is claimed is:

1. A test circuit for a computer-controlled automatic transmission that has plural solenoid valves, comprising:
    a rotary switch for selecting one of the automatic transmission gear speeds;
    logic circuitry enabled by the rotary switch to provide a selection output;
    plural switch circuits receiving said selection output and generating at least one relay control outputs; and
    at least one relays energizable by said at least one control outputs to provide a ground connection input to the automatic transmission to energize at least one of the plural solenoid valves.

2. A test circuit as set forth in claim 1 which is further characterized to include:
    an interface connector having multiple conductors for connecting the test circuit to the automatic transmission.

3. A test circuit as set forth in claim 1 wherein said rotary switch is characterized to include:
    switch positions for test, park/neutral, and the first, second, third and fourth forward gears.

4. A test circuit as set forth in claim 2 which further plural pressure indicators connected through the interface connector to sense low hydraulic pressure condition at respective solenoid valves.

5. A test circuit as set forth in claim 1 which is further characterized to include:
    at least one push button switches connected in bypass of said at least one relays and actuatable to test the respective at least one relays energization.

6. A test circuit as set forth in claim 1 wherein said logic circuitry is further characterized to include:

first and second time delay means connected to two respective ones of said switch circuits and effective to delay switch circuit generation when shifting into third gear and into fourth gear, respectively.

7. A test circuit as set forth in claim 6 wherein said logic circuitry includes:
a pulse duration output means consisting of an R-C controlled latch circuit connected to the second gear switch circuit and effective to allow switch circuit generation when shifting down from second gear to first gear while preventing the system from shifting to neutral.

* * * * *

UNITED STATES PATENT AND TRADEMARK OFFICE
CERTIFICATE OF CORRECTION

PATENT NO. : 5,060,177
DATED : October 22, 1991
INVENTOR(S) : Stevon D. Gregory and Fred J. Blackburn It is certified that error appears in the above-identified patent and that said Letters Patent is hereby corrected as shown below:

Column 4, line 58, insert --includes:-- after the word "further".

Signed and Sealed this

Second Day of February, 1993

*Attest:*

STEPHEN G. KUNIN

*Attesting Officer*     *Acting Commissioner of Patents and Trademarks*